March 29, 1960   J. F. SCAMMAN ET AL   2,930,980
INDUCTION WATTHOUR METER
Filed Dec. 31, 1956   3 Sheets-Sheet 1
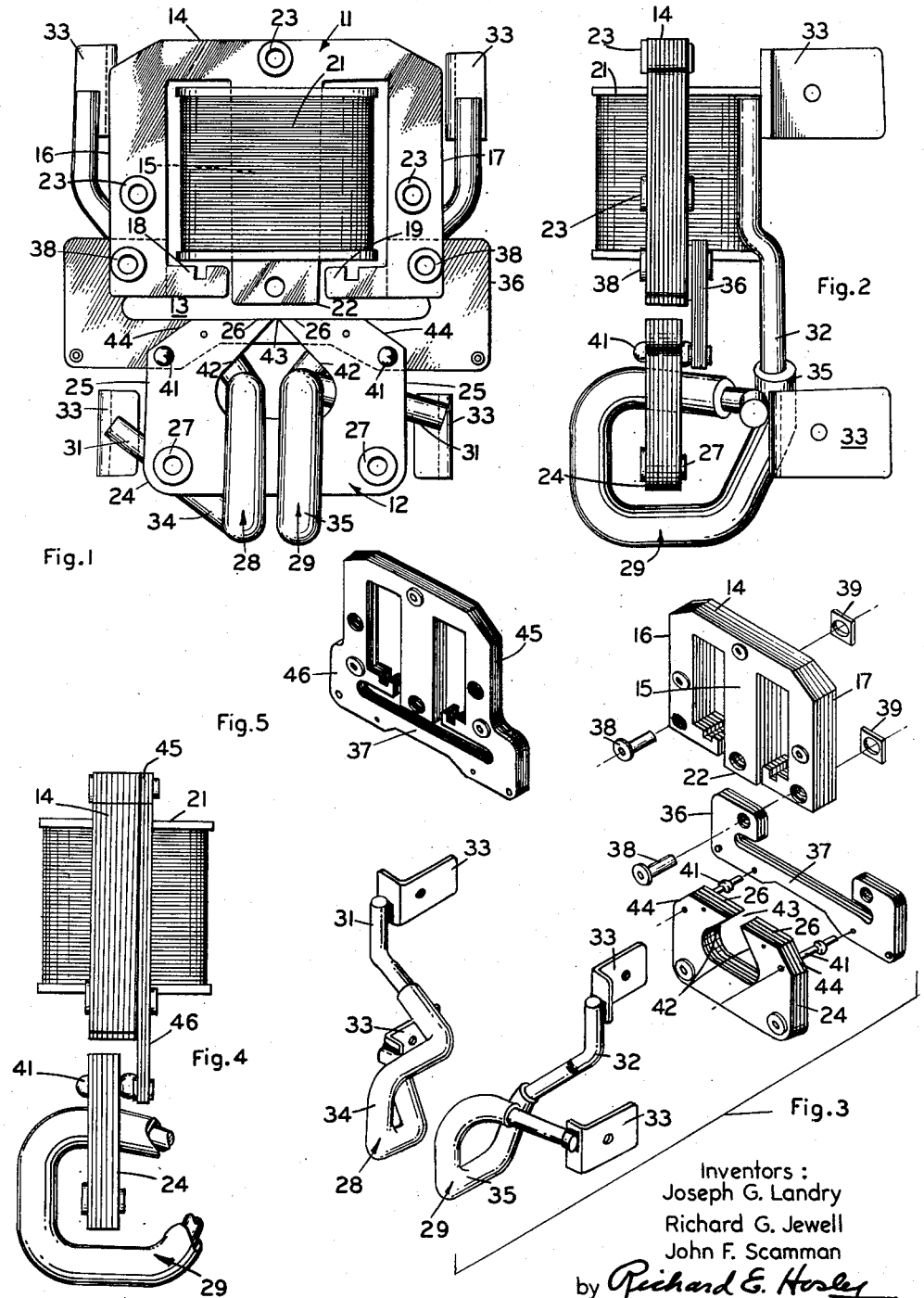
Inventors:
Joseph G. Landry
Richard G. Jewell
John F. Scamman
by Richard E. Hosley
Their Attorney

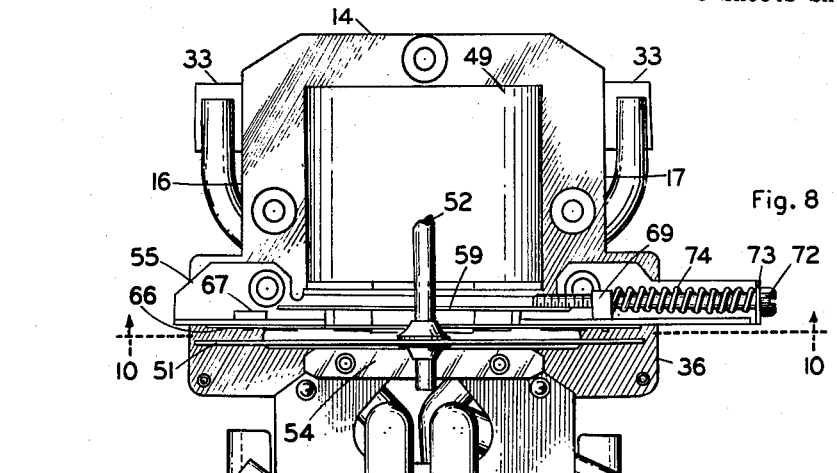
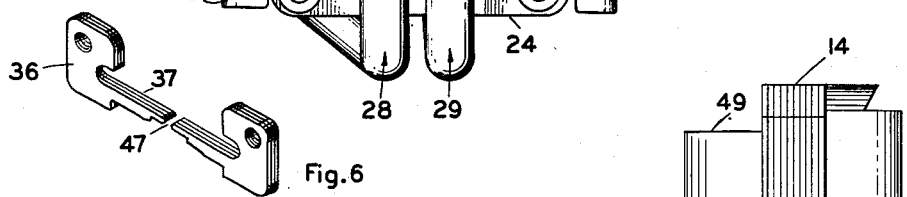
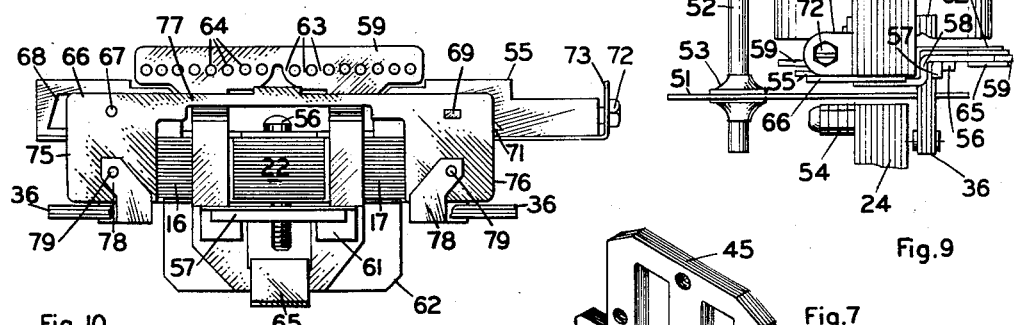
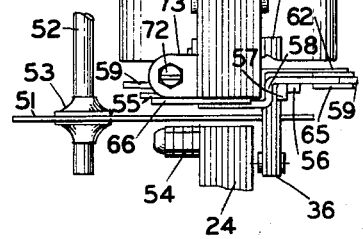
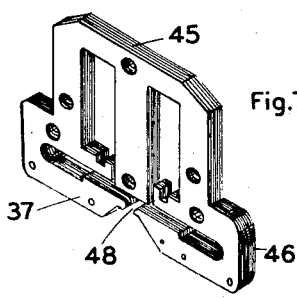
Inventors:
Joseph G Landry
Richard G. Jewell
John F. Scamman
by Richard E. Horley
Their Attorney March 29, 1960     J. F. SCAMMAN ET AL     2,930,980
INDUCTION WATTHOUR METER Filed Dec. 31, 1956     3 Sheets-Sheet 3

Inventors:
Joseph G. Landry
Richard G. Jewell
John F. Scamman
by Richard E. Hosley
Their Attorney

United States Patent Office 2,930,980
Patented Mar. 29, 1960

2,930,980

INDUCTION WATTHOUR METER

John F. Scamman, Dover, N.H., Joseph G. Landry, South Berwick, Maine, and Richard G. Jewell, Swampscott, Mass., assignors to General Electric Company, a corporation of New York Application December 31, 1956, Serial No. 631,854

11 Claims. (Cl. 324—137)

This invention relates generally to a new and improved self-contained electric watthour meter of the induction type and more particularly to new and novel improvements in such meters which extend their effective metering range, improve their accuracy, reduce their manufacturing costs, and in general provide higher quality, more economical metering of electrical energy consumption.

Accurate and economical metering of electrical energy consumption has played a very important part in the tremendous growth of the electric power industry up to the present time, and with the continuing and expected increase in the consumption of electrical energy in the homes, on the farms and among all types of industrial and commercial users of electricity, it is apparent that the metering of electrical energy consumption must keep in step with the ever-increasing loads to at least continue and preferably excel the accurate and economical preformance achieved to date.

At the present time, the electrical industry is using two classes of meters to encompass the range of loads handled by self-contained meters, these classes being conveniently designated as low-rating and high-rating meters. The low-rating meters are normally used to handle loads not exceeding 100 amperes whereas the high-rating meters are normally used to handle loads in excess of 100 amperes, up to a maximum of 200 amperes. In a conventional single-phase distribution system of the three-wire type, the high-rated meters must handle 200 amperes per line.

Most of the self-contained meters in use today are low-rating meters, for the average electrical energy consumption measured by these meters is much less than 100 amperes and does not exceed 100 amperes for any short-term demand by the services connected to the meters. As a matter of fact, a recent survey of approximately 55 million residences indicates that the average maximum residential load in 1956 is 18.6 amperes, thus demonstrating the capabilities of the low-rated meters for handling practically all of today's residential load.

However, there are some users of self-contained meters who, at least on a short-term basis, use more than 100 amperes in their services and it is necessary to provide such users with a high-rated meter. These high-rated meters are adequate for the job they must do but they cost more to manufacture and they do not give performance at light loads that is comparable to the low-rated meters. For the small percentage of present users who require the high-rated meters, the sacrifice in light load performance and the additional cost to the meter manufacturers can be tolerated, because the low-rated meters are not practical to use for measuring loads in excess of 100 amperes. In other words, where the service installation requires a meter that can handle loads in excess of 100 amperes, the high-rated meter is the only meter for the job.

In looking to the future the situation confronting the power companies will materially change, for it is firmly predicted that average maximum residential loads will rise significantly and conceivably reach a point where short-term demands in excess of 100 amperes would be the rule rather than the exception for the average meter. Bearing in mind that self-contained meters are extremely rugged, serviceable and reliable and have a life expectancy of between 20 and 30 years and in many instances an even greater number of years of economical service, the problem confronting the power companies today is brought into sharp focus, for if they buy low-rated meters to handle today's loads, it is entirely possible that a substantial number of such meters will be obsoleted years ahead of their normal life expectancy when the loads metered by the low-rated meters exceed 100 amperes. Since watthour meters entail a substantial investment on the part of power companies, it is apparent that premature obsolescence of substantial numbers of watthour meters would be looked upon as a highly undesirable situation by the power companies.

To overcome this problem and to plan properly for the future, many power companies are buying high-rated meters today, willing to sacrifice performance at the light loads of today's user for the long-term gain that will surely be theirs when the user loads reach the anticipated loads that require a high-rated meter. Thus, in those instances where power companies are buying the high-rated meters in anticipation of future requirements, they are getting a meter that will not have to be replaced prior to the end of its normal period of use, but they are sacrificing metering performance today at a consequent loss in revenue.

For the meter manufacture the problem is one of manufacturing cost, for the high-rated meters are inherently more costly to manufacture than are the low-rated meters, but they have to be priced competitively with the low-rated meters in view of the increasing trend on the part of power companies to buy the high-rated meters for their long-term needs. The primary cause for the higher manufacturing costs is the complicated and expensive current winding used for the high-rated meter. Long-established practice in the industry more or less dictates sizes of the self-contained meters, the torque and speeds of rotating discs forming a part of the meters, both of which limit the permissible ampere turns in the current elements of such meters, all of which led the meter manufacturers to uniformly achieve a high-rated meter by devising a special form of current winding in place of the conventional current windings heretofore used on the low-rated meters. For example, in a conventional self-contained, single-phase meter having a pair of current poles and a single-voltage pole, with an overload capacity not exceeding 100 amperes, the current winding normally comprises two turns on each pole for either two or three-wire service. With such a winding the number of ampere turns on the current side of the meter does not exceed the permissible limits, but if a similar winding is used for a high-rated meter having an overload capacity of 200 amperes, the number of ampere turns on the current side of the meter will exceed permissible limits and thus seriously impair the performance of the meter. In order not to impair performance, meter manufacturers have uniformly adopted a so-called "split coil winding arrangement" for the high-rated meters which in the case of a meter connected for three-wire service means that each current line coming into the meter is divided into a pair of parallel branches, there being one branch for each of the two current poles. Each branch is formed into a one-turn winding about its respective pole, after which the branches rejoin to reform the current line. It is readily seen that with such an arrangement the winding will carry the increased current for the high-rated meter but the ampere turns on the current side will be the same as in the case of the low-rated meter.

Unfortunately, such split coil windings are costly to manufacture and they introduce an objectionable side effect which interferes with accurate meter performance in that the closed loop formed between the junctions of the parallel branches appears to the voltage flux as a short-circuited winding which can upset the quadrature relationship required between the voltage and current fluxes. This side effect must be compensated for, which adds further to the complexity and cost of the meter.

From the above, it is thus seen that the high-rated meters heretofore available are objectionable from the standpoint of the power companies because of their poor performance under today's load conditions and they are objectionable from the standpoint of the meter manufacturers because of their increased manufacturing costs.

Therefore, it is a primary object of the invention to provide a high-rated meter at a manufacturing cost no greater than the manufacturing costs for existing low-rated meters and possessing performance characteristics that either equal or excel, for any load up to 200 amperes, the performance characteristics of existing low-rated or high-rated meters.

It is another object of the invention to provide a new and greatly simplified current winding in self-contained watthour meters.

It is yet another object of this invention to provide a new and greatly simplified design for a watthour meter whereby there is obtained a degree of flexibility in the selection of compensating arrangements that was not hitherto possible.

It is still another object of this invention to provide a design for a watthour meter which allows optimum choice in the selection of the magnetic materials used in both the current and voltage electromagnets forming a part of the meter.

Briefly, and in one aspect thereof, the invention comprises a new stator arrangement for a watthour meter in which the conventional one-piece combined voltage and current electromagnet heretofore used has been replaced by a pair of magnetically separated electromagnets, there being one for voltage and one for current.

The voltage electromagnet has the usual single-pole on which the voltage winding is arranged and the current electromagnet has the usual pair of current poles but instead of having the current winding arranged on the current poles, it is formed into a pair of partially open turns arranged around that part of the current electromagnet which bridges the two poles.

The two electromagnets may be conventionally arranged on opposite sides of the watthour meter disc, with their poles extending toward each other and at right angles to the disc. A novel voltage flux return member is affixed to the voltage electromagnet and has a portion thereof situated on the current side of the meter, spaced from the current core, with portions thereof extending along one side of the current electromagnet.

The current coils for either two-wire or three-wire service are easily and inexpensively formed from conducting rod stock, and are quite readily slipped onto the current core during assembly of the meter. These coils can handle currents up to 200 amperes and since there are only half the number of turns in comparison with existing low-rated meters, the maximum ampere turns will not exceed permissible limits.

The arrangement of the voltage flux return member along one side of the current core permits maximum utilization of the available voltage flux while at the same time minimizing undersirable intermingling of the current and voltage fluxes within the respective cores. Moreover, the flux return member permits the use of separate magnetic cores for the voltage and current electromagnets, with its attendant advantages, most important of which is the simple coil form that may be utilized for the current winding and another of which is the flexibility allowed in the design of the electromagnets—each can be arranged for optimum performance and efficiency of material.

Moreover, with the flux return member along the side of the current core, the pole faces of the current core can be brought together as close as desired to obtain maximum effectiveness from the current flux. That is, with the current pole faces brought closely together, the fluxes emanating therefrom have maximum driving effect on the disc, accompanied by minimum damping effect, thereby establishing maximum effectiveness for the current flux. Furthermore, the partially open turn form used for the current coils allows any desired spacing between the current core pole faces, for these coils do not require any predetermined clearance space between the pole faces to allow assembly of the coils, since assembly is easily accomplished by merely threading the coils on the completed current core in any desired manner.

The invention, together with its objects and advantages, will be more readily understood upon reference to the detailed specifications set forth below, when taken in conjunction with the drawings annexed hereto, in which:

Figure 1 is a front view in elevation of the assembly of the voltage and current electromagnets forming the subject invention;

Figure 2 is a side view in elevation of the arrangement shown in Figure 1;

Figure 3 is an exploded perspective view of the arrangement shown in Figure 1;

Figure 4 is a view similar to Figure 2 of a slightly modified form of the invention;

Figure 5 is a view in perspective of part of the arrangement shown in Figure 4;

Figure 6 is a view similar to Figure 5 showing a further modification of the part shown by Figure 5;

Figure 7 is a view similar to Figure 5 showing a still further modification of the part shown in Figure 5;

Figure 8 is a front view in elevation of a watthour meter embodying the electromagnet assembly of Figure 1;

Figure 9 is a partial side view of the arrangement shown in Figure 8;

Figure 10 is a view taken along the lines 10—10 of Figure 8 with the rotary disc armature removed; and, Figures 11, 12 and 13 are typical curves showing performance of a watthour meter constructed in accordance with this invention.

Figure 11:
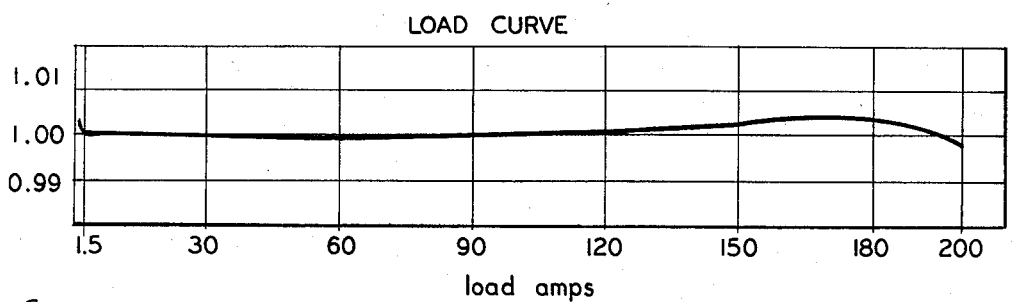

Referring now to Figure 1, it is seen that the electromagnet assembly includes a voltage electromagnet 11 and a current electromagnet 12 arranged substantially symmetrically with respect to one another and separated by an air gap 13 in which may be mounted a rotary disc armature.

The voltage electromagent is in part constructed along conventional lines in that it comprises a substantially E-shaped core 14 having center leg 15 and outer legs 16, 17. Each of the outer legs has identical shunting portions 18, 19 projecting inwardly toward the center leg 15, both of which are spaced from the center leg by suitable air gaps and the center leg 15 is surrounded by a voltage winding 21, the arrangement being such that the center leg 15 is the core for the voltage winding 21 and has its outer extremity formed as a voltage flux pole 22.

As is readily seen in Figure 2, the E-shaped core 14 comprises an assembly of identical substantially E-shaped laminations of magnetic material held together securely by suitable means such as rivets 23 or the like.

The arrangement so far described is quite conventional and well understood by those skilled in the art, it being understood that a voltage electromagnet of superior characteristics is attained thereby.

Situated opposite the voltage electromagnet is the current electromagnet 12 which comprises a substantially U-shaped core 24 whose legs 25 have their outer extremities forming a pair of spaced current flux poles 26 which underlie the voltage flux pole 22 and are spaced therefrom. As is readily seen in Figure 2 the current core 24 also comprises an assembly of substantially identical laminations of magnetic material suitably secured together by means of rivets 27 or the like.

Surrounding the base of the core 24 is a current winding comprising a pair of partially open turns 28, 29, both of which may be preformed prior to assembly on the current core from substantially rigid electrically conducting rod stock.

As can be seen in Figures 1, 2 and 3, the turns 28, 29 are similar but they are not identical, inasmuch as they extend around the base of the current core 24 in opposite directions. The reverse arrangement is shown because the particular watthour meter selected for illustrating this invention is arranged for three-wire service, which, in all probability, will be the most commonly used form of the invention. When so arranged, each turn will be connected to its own current line, the currents of which are normally 180° out of phase with each other so that by reversing the winding arrangement for the two turns, the fluxes produced by the turns will be in phase as required for measurement of total power consumed in the system.

As stated above, the turns 28, 29 are preformed from conducting rod stock, the preformed rods being shown at 31, 32 respectively, to the ends of which are secured by any suitable means such as soldering or brazing or the like conventional watthour meter terminals in the form of the blades 33. Prior to securing the blades 33 in place, insulation may be provided for the rods 31, 32 by slipping tubular jackets 34, 35 of insulation material on each of the rods.

It is to be noted that the turns 28, 29 are relatively uncomplicated in configuration, which allows the turns to be inexpensively manufactured. Since the partially open configuration is used, the turns are also inexpensively and easily assembled to the current core 24 merely by threading the turns in place, that is by suitable manipulation of the turns until they are arranged in proper position on the core. Insulation is easily applied and the net effect of the overall arrangement is to produce a current winding that is substantially less costly to manufacture than the complicated "split coil" current windings heretofore employed for high-rated watthour meters. Aside from the savings resulting from the simplified fabrication and assembly of the novel turns, there is an outstanding savings in copper in that the new form of current winding uses approximately one-fourth the amount of copper heretofore used for the "split-coil" windings used in the "high-rated" meters.

In addition to the aforesaid outstanding reduction in manufacturing costs the positioning of the current coils between the legs of the current core produces other beneficial effects, in that undesirable linkage of leakage current flux with the disc armature is reduced to a minimum and balance problems occurring in three-wire service are substantially eliminated.

If the current coils were mounted on the current core in a conventional manner—that is, upon the legs of the current core—for either two-wire or three-wire service, leakage flux from the current coils would link the disc armature and produce undesirable effects on meter performance. Furthermore, and assuming a conventional arrangement of the turns 28, 29 when the meter is connected for three-wire service, any unbalanced load in the system will result in more current flowing through one turn than through the other, and the turns will thus have a tendency to identify themselves as independent flux producers, creating an unbalanced condition which also interferes with proper meter performance. By positioning the turns between the legs of the current core, it is thus apparent that undesirable linkage of leakage current flux is reduced to a minimum and that the balance problem is substantially eliminated.

Since only one turn is used for each line in a three-wire system, each turn can carry 200 amperes simultaneously and the ampere turns at maximum load is only 400 ampere-turns, which is within permissible limits for this type of self-contained watthour meter. Furthermore, if the meter is given a nominal rating of 30 amperes, the ampere turns at nominal load would be 60 which would be the same for the "low-rated" meters having four turns with a nominal rating of 15 amperes. As a matter of fact, and as will be described more fully hereinafter, watthour meters constructed in accordance with this invention could have a nominal rating of 15 amperes, for their performance at light load is well within the limits of light load performance that correspond to a nominal rating of 15 amperes.

From the above, it is seen that the relatively simple current windings permit a substantial reduction in the manufacturing costs for high-rated meters and now will be described an important innovation in watthour meter design that permits the use of this cost reducing current winding.

First of all, it is to be noted that the current and voltage electromagnets are magnetically separated, with the U-shaped current core providing a highly efficient flux path for the current flux; that is, maximum utilization of the current flux is provided for driving the watthour meter disc accompanied by a minimum loss in current flux through undesirable leakage.

Secondly, a voltage flux return member 36 is provided as a part of voltage electromagnet 11, which cooperates with the E-shaped core 14 to provide a highly efficient flux path for the voltage flux; that is, maximum utilization of the useful voltage flux is provided for driving the watthour meter disc accompanied by a minimum loss in useful voltage flux through undesirable leakage.

Separation of the current and voltage electromagnets permits use of the simplified windings on the U-shaped current core 24 and the voltage flux return member 36 allows such separation and at the same time provides an efficient magnetic circuit for the voltage electromagnet. Moreover, physical separation of the current and voltage electromagnets provides two substantially separated magnetic circuits, each more or less independent of the other with any undesirable intermingling of the current and voltage fluxes being reduced to a minimum. By having two physically separated magnetic circuits for the current and voltage fluxes, each circuit can be designed for optimum utilization of the particular flux which passes through it, thereby avoiding the compromises in core design and selection of magnetic materials heretofore resorted to in watthour meters wherein each electromagnet was required to accommodate both current and voltage fluxes.

Referring once again to the drawings, it is seen that the voltage flux return member 36 is generally in the form of a U-shaped member which has its central portion 37 displaced from the voltage flux pole 22 and disposed on the other side of the disc armature and has its outer extremities extending ground the peripheral edge of the disc armature on opposite sides thereof and secured to the outer extremities of legs 16, 17 by suitable rivets 38. In the form shown in Figures 1 to 3, the flux return member 36 comprises an assembly of substantially identical laminations of magnetic material and this assembly may be affixed to the voltage core 14 or spaced therefrom by spacer members 39, formed of a suitable non-magnetic material.

The central portion of flux return member 36 extends alongside of the current core 24 proximate to the current poles 26 and is separated therefrom by a suitable air gap with the current core 24 being mounted on the flux return member 36 by means of suitable non-magnetic rivets 41.

With the above arrangement in mind, it is apparent that the useful voltage flux passing out from the voltage flux pole 22 crosses through the disc armature into the central portion 37 of the voltage flux return member, after which it returns to the main voltage core 14 through the outer extremities of the flux return member and the outer legs 16, 17 of the voltage core.

The current flux travels alternately in both directions through the U-shaped current core 24 using the tip of the voltage flux pole 22 as a part of its magnetic circuit, but behaving substantially as an independent flux circuit. Likewise, the voltage flux circuit is substantially independent and with two physically separated magnetic circuits for the current and voltage fluxes, any undesirable intermingling of the two fluxes is reduced to a minimum.

In the construction wherein the voltage flux member 36 extends alongside the pole portions of current core 24, the design of the outer extremities of the current flux poles may be established substantially independently of the other core designs. The outer pole portions of core 24 have been displaced toward each other in the Fig. 1 arrangement to minimize the spacing therebetween. Thus, the inner edges 42 of the current core legs 25 are inclined rather sharply toward each other and separated at their extremities by a very narrow air gap 43. In the form of the invention shown in Figure 1, this air gap is on the order of 0.10 inch and because it is so narrow compared to air gaps heretofore used for separating the current flux poles, an additional current pole face area is obtained underneath the voltage flux pole 22 where it is more effective than at any other location relative to the armature disc and voltage flux pole to produce flux for efficiently driving the watthour meter disc. With the current poles separated by the narrow air gap 43, the flux coming from the proximate areas of the current flux pole faces produces a high driving torque and a relatively low undesirable damping torque.

Conversely, the outer portion of each current pole face contributes flux that produces relatively low driving torque and relatively high damping torque. Since damping torques are a major source of overload errors in a watthour meter, it is desirable that they be minimized and to this end, the outer corners of the legs 25 have been cut away at 44 to minimize the current pole face area in that region which normally would produce undesirable damping torques.

Thus, another benefit is derived from the partially open turns 28, 29 since the width of air gap 43 may be selected for optimum utilization of current flux without being limited to a predetermined minimum spacing heretofore required in prior art structures to allow assembly of the current windings onto the current core. As discussed above, the turns 28, 29 are easily threaded onto the current core by suitable manipulation and do not require any particular width for the gap 43. As a matter of fact, the diameter of the rod stock from which the turns 28, 29 are fabricated is substantially greater than the width of gap 43.

From the above, it is also apparent that this invention provides a greatly improved electromagnetic structure for a high-rated watthour meter allowing superior performance at reduced manufacturing costs without departing from the general arrangement of electromagnets and overall size found desirable for self-contained induction watthour meters.

The voltage flux return member may take other forms than that shown in Figure 1, one of these alternate forms being shown in Figures 4 and 5 wherein the two-part construction used in the arrangement of Figure 1 has been replaced by a substantially integral arrangement which has the voltage flux member formed as an integral part of some of the laminations forming the voltage flux core. Thus, and using like numbers to identify like parts, the voltage electromagnet comprises a core 14 similar to the core shown in Figure 1 but provided with an additional set of E-shaped laminations 45 secured to one side thereof. The laminations 45 have the U-shaped flux return member 46 formed as an integral extension of the lower extremities of its outer legs including a central flux return portion 37 which underlies the voltage flux pole 22 on the other side of the disc armature. As in the arrangement of Figure 1, the laminations 45 are secured together by rivets or the like, after which the assembly of the laminations 45 may be secured to the voltage core 14 by rivets or the like. As in the embodiment of Figure 1, the current core 24 is mounted on the flux return member by suitable non-magnetic rivets 41 and is spaced therefrom.

Figure 6 shows another form of the invention similar in all aspects to the arrangement of Figure 1 wherein the voltage flux return member 36 is divided into two pieces separated by an air gap 47 located mid-way of its central portion 37.

In Figure 7 there is shown still another form of the voltage flux return member similar in all respects to the arrangement shown in Figures 4 and 5 wherein the auxiliary laminations 45 are formed with an air gap 48 located mid-way of its center portion 37.

Turning now to Figures 8, 9 and 10, where there is shown, in addition to the electromagnet structures heretofore described, other components which co-act with the electromagnets to form a watthour meter assembly, it is first to be noted that the electromagnet shown herein is that shown in Figure 1, with the potential winding 21 being covered by insulation material 49 suitably applied thereto by molding or the like, all in a manner well understood by those skilled in the art. Here again, like numbers will be used to identify like parts and mounted for rotation in air gap 13 is the watthour meter disc armature 51 which is mounted on a vertically disposed shaft, a portion of which is shown at 52, these two parts being joined by a suitable hub 53. The upper and lower extremities of the shaft 52 may be journalled as shown in U.S. Patent 2,311,382 of Hansen, which, upon reference thereto, illustrates and describes a magnetic suspension for the armature disc. As is also shown in the aforesaid Hansen patent, it is to be understood that the shaft 52 will have a portion thereof in the form of a worm gear which will cooperate in the known manner with a suitable worm wheel connected to a conventional watthour register mechanism.

The details of the mounting arrangements for the shaft 52, as well as other components forming a complete self-contained watthour meter, will be omitted herein in the interests of brevity since such details are well known in the art, being shown in the aforesaid Hansen patent and also disclosed in even greater detail in U.S. Patent 2,668,275, issued to Goss et al., both of these patents being assigned to the same assignee to which the subject invention is assigned.

The current core 24 has secured to its outer face by suitable bolts or the like a conventional overload compensating magnetic shunt 54. It is to be noted that the location of the flux return member 36 in no way interferes with the location of the magnetic shunt 54, thus permitting these two parts to be located on opposite sides of the current core 24 to thereby further minimize any undesirable intermingling of the current and voltage fluxes.

Secured to the voltage core 14 there is an elongated substantially L-shaped mounting bracket 55 which carries thereon a light load compensating member 66. Bracket 55 is secured to the voltage core 14 by the rivets 38 which, as mentioned above, also secure the voltage flux return member 36. At the center of this bracket is mounted a screw 56 which passes through the center leg 15 of the E-shaped core 14 where its threaded outer end cooperates with an elongated threaded plate 57. The outer extremities of plate 57 press against corresponding offset portions 58 of a lag plate 59 mounted underneath the voltage flux pole 22 and held in place by the cooperation between its offset portions 58 and clamping plate 57. The clamping plate 57 may be insulated from the lag member 59 by means of a strip of fiber insulation material 61 and the lag plate 59 may be insulated from the remainder of the voltage electromagnet by means of another properly configured piece of fibrous insulating material 62.

The lag plate 59 is similar in principle to that disclosed in U.S. Patent 2,321,437 issued to Trekell and assigned to the same assignee to which the subject invention is assigned, and as is well understood by those skilled in the art, functions to obtain the proper quadrature relationship between the current and voltage fluxes. Its resistance may be adjusted to achieve compensating action by selectively severing webs 63 lying between the holes 64, all in accordance with the teachings of the aforesaid Trekell patent. A temperature compensating magnetic circuit member 65 is also provided on the lag plate 59. The front edge of the lag plate 59 which contains the holes 64 is offset from the side legs which pass under the voltage flux pole and is arranged between the L-shaped bracket 55 and a light load compensating member 66.

As is best shown in Figure 8, the light load compensating member has a rivet 67 affixed to one end which is adapted to slide in a slot provided in the bracket 55, a portion of which is seen at 68 in Figure 10. On the other end of light load compensating member 66, there is a nut which has a shank of reduced width lying in a second slot provided in bracket 55, a portion of which is shown at 71 in Figure 10. Cooperating with the nut 69 is a screw 72 which passes through an ear 73 formed at one end of bracket 55, there being a coil spring 74 lying between the ear and the nut 69 to take up any slack in the assembly. Adjustment of the screw 72 causes the light load compensating member to move to the right or left relative to the electromagnets and if a suitable magnetic material is used for the member 66, excellent light load compensation will be achieved.

It is to be noted that the light load compensating member 66 is constructed with two auxiliary pole pieces 75, 76 which are connected by a relatively narrow web 77, the two pole pieces lying approximately below the extremities of the outer legs of the voltage core 14 and in the air gap 13. These auxiliary pole pieces reduce the air gap between the current core and the extremities of the outer legs 16, 17 and thereby tend to concentrate the potential flux at their respective locations. The potential flux so concentrated induces eddy currents in corresponding portions of the meter disc below each of the pole pieces and the effective impedance of the circuits in which these currents flow include both resistive and reactive components.

With the light load member 66 arranged symmetrically, the two eddy currents induced by the auxiliary pole pieces cancel each other's effects, but when the compensating member is moved to either the right or the left, one of the auxiliary pole pieces will be moved toward the edge of the meter disc and the other will be moved away from the edge of the meter disc. The closer to the edge the pole piece is moved, the more resistive becomes the effective impedance in the circuit in which the eddy current flows, and conversely, the further away from the edge of the disc, the less resistive becomes the effective impedance in the eddy current circuit.

Thus, the fluxes on opposite sides of the disc can be altered in phase which in effect will produce a rotating flux causing the disc to experience a torque proportional to voltage and proportional to, but in the opposite direction from the displacement of the auxiliary pole pieces from their symmetrical position. The arrangement thus has the effect of reducing class II temperature errors and other effects upon the current flux which are normally associated with light load adjustment.

To assist in maintaining the light load member properly in place, there is provided on the reverse side of the electromagnet a pair of spring clips 78, each of which has a detent 79 formed therein pressing against the surfaces of the pole pieces. The spring clips are secured to the electromagnet by means of the rivets 38.

Although a magnetic form of light load compensating member has been described above, it is to be understood that it forms no part of the subject invention. It is to be further understood that conventional light load plates of conducting material may be used with equal facility. Such alternate forms of light load compensating members may be of the type similar in principle to those shown in U.S. Patent 1,062,031, Pratt, and 2,146,606, Trekell, both of which are assigned to the assignee to which this invention is assigned.

Thus, it is seen that conventional lag and light load compensating members may be used with the novel electromagnet structure heretofore described with the resulting watthour meter functioning effectively over a range of loads extending from no load to 200 amperes.

Figure 12:
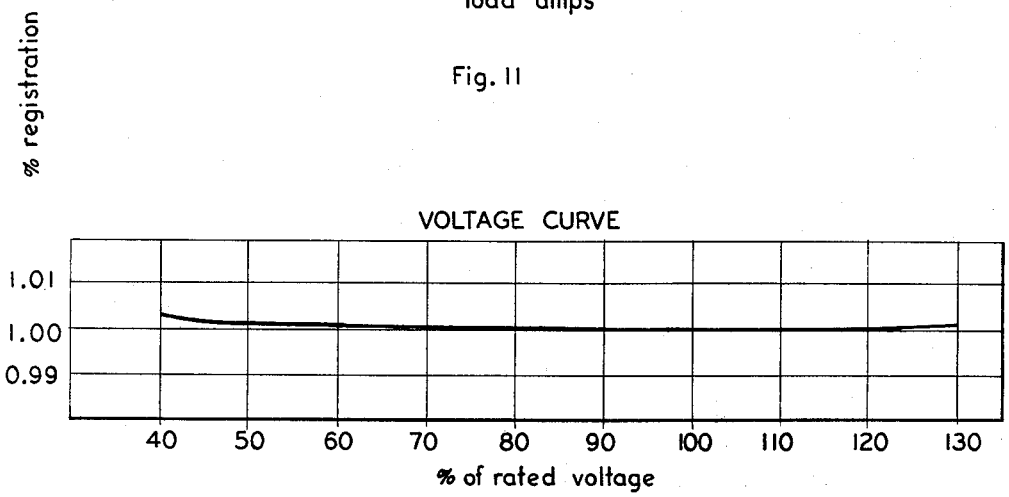
Figure 13:
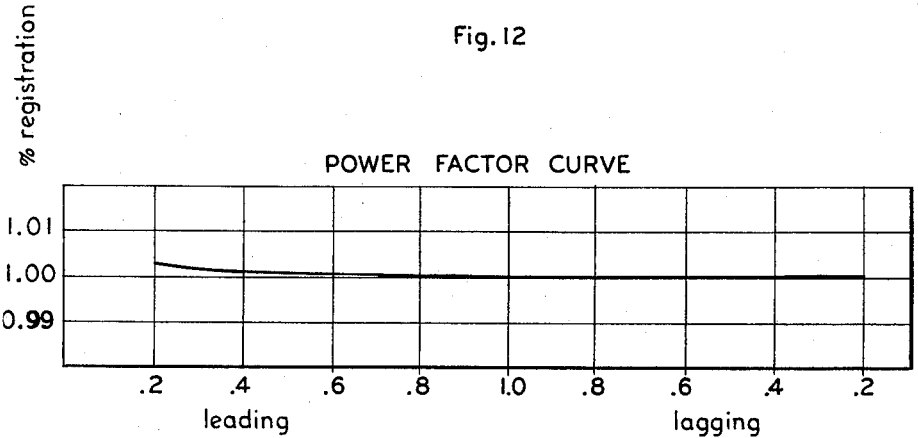

For a graphic illustration of the superior performance achieved with a watthour meter constructed in accordance with the subject invention, reference will now be had to Figures 11, 12 and 13 where a set of typical performance curves is shown. In all of these curves, the percent registration which is indicative of the accuracy of the watthour meter is the ratio of meter reading to true watthours.

Referring first to Figure 11, wherein is shown a typical load curve for a meter operating at 240 volts and unity power factor, it is highly significant to note that there is no error in meter registration between the range in amperes of 1.5 to 30 amperes. This performance clearly indicates that watthour meters constructed in accordance with this invention may be given a nominal rating of either 15 or 30 amperes in view of the fact that there is no error in registration at any point below these nominal ratings down to 1.5 amperes, which represents a light load of 10 percent in the case of a nominal rating of 15 amperes and 5 percent in the case of a nominal rating of 30 amperes.

The upward hook below the 1.5 ampere point indicates that the meter requires low starting watts which is another desirable performance characteristic.

Looking now at Figure 12, there is shown a voltage curve of a meter operating at 30 amperes and unity power factor and over a range of 40 to 130 percent of a rated voltage of 240 volts. At the 100 percent point on the curve, there is no error in meter registration nor is there any error for 10 percent deviations in voltage above or below the rated value. As a matter of fact, there is no error up to 120 percent rated voltage which shows that the watthour meter may be used in those three-wire systems which have 277 volts connected across the watthour meter.

Figure 13 is a power factor curve for a watthour meter operating at 30 amperes at a voltage of 240 volts and this curve clearly shows the desirable performance with substantial variations in power factor.

Therefore, while particular embodiments of the subject invention have been shown and described herein, these are in the nature of description rather than limitation, and it will occur to those skilled in the art that various changes, modifications, and combinations may be made within the province of the appended claims, and without departing either in spirit or scope from this invention in its broader aspects.

What we claim as new and desire to secure by Letters Patent of the United States is:

1. In an electric watthour meter of the induction type, in combination: a rotatably mounted disc armature, a voltage electromagnet arranged on one side of said disc, said voltage electromagnet including a substantially E-shaped core member having its center leg forming a voltage flux pole, a current electromagnet arranged on the other side of said disc, said current electromagnet including a substantially U-shaped core member having its legs forming a pair of spaced current flux poles, said voltage and current flux poles being substantially symmetrically arranged with their respective legs lying in a substantially common plane and extending toward each other and at right angles to said disc, and a flat planar voltage flux return member lying in a plane parallel to said common plane and having a first portion thereof located on the current electromagnet side of the disc, said first portion extending along one side of the pole portions of the current electromagnet and displaced therefrom by non-magnetic means, said voltage flux return member having second portions at each end of the first portion, said second portions extending around the disc and being magnetically coupled to the outer legs of the E-shaped core member.

2. In an electric watthour meter of the induction type, in combination: a rotatably mounted disc armature, a voltage electromagnet arranged on one side of said disc, said voltage electromagnet including a substantially E-shaped core member having its center leg forming a voltage flux pole, a current electromagnet arranged on the other side of said disc, said current electromagnet including a substantially U-shaped core member having its legs forming a pair of spaced current flux poles, said voltage and current flux poles being substantially symmetrically arranged with their respective legs lying in a substantially common plane and extending toward each other and at right angles to said disc, and a flat planar voltage flux return member lying in a plane parallel to said common plane and having a first portion located on the current electromagnet side of the disc, said first portion extending along one side of the pole portions of the current electromagnet and displaced therefrom by non-magnetic means, said first portion having a centrally located air gap separating it into two parts, said voltage flux return member having second portions at the outer end of each of said parts, said second portions extending around the disc and being magnetically coupled to the outer legs of the E-shaped core.

3. In an electric watthour meter of the induction type, in combination: a rotatably mounted disc armature, a voltage electromagnet arranged on one side of said disc, said voltage electromagnet including a substantially E-shaped core member having its center leg forming a voltage flux pole, a current electromagnet arranged on the other side of said disc, said current electromagnet including a substantially U-shaped core member having its legs forming a pair of spaced current flux poles, said voltage and current flux poles being substantially symmetrically arranged with their respective legs lying in a substantially common plane and extending toward each other and at right angles to said disc, and a flat planar voltage flux return member lying in a plane parallel to said common plane and having a substantially U-shaped portion, the base portion of said U-shaped flux return portion being located on the current electromagnetic side of the disc where it extends along one side of the pole portions of the current electromagnet and is displaced therefrom by non-magnetic means, the legs of said U-shaped flux return portion joining at one end the ends of said base portion and joining at the other end the outer legs of the E-shaped core member, said legs of the flux return member extending around the edge of the disc.

4. The invention defined by claim 3 in which the base portion of the U-shaped flux return portion has a centrally located air gap which divides the base portion into two parts.

5. In an electric watthour meter of the induction type, in combination: a rotatably mounted disc armature, a voltage electromagnet arranged on one side of said disc, said voltage electromagnet including a plurality of substantially E-shaped laminations of magnetic material secured together to form a substantially E-shaped laminated core member, said voltage core member having its center leg forming a voltage flux pole, a current electromagnet arranged on the other side of said disc, said current electromagnet including a plurality of substantially U-shaped laminations of magnetic material secured together to form a substantially U-shaped core member having its legs forming a pair of spaced current flux poles, said voltage and current poles being substantially symmetrically arranged with their respective legs lying in a substantially common plane and extending toward each other and at right angles to said disc, and a flat planar voltage flux return member secured to said voltage electromagnet and lying in a plane parallel to said common plane, said flux return member comprising a plurality of substantially U-shaped laminations of magnetic material secured together to form a substantially U-shaped flux return member, the base portion of the flux return member being located on the current electromagnet side of the disc where it extends along one side of the pole portions of the current electromagnet and is displaced therefrom by non-magnetic means, the legs of the U-shaped flux return member extending upwardly from the ends of the base portion around the edge of the disc and adjacent to the ends of the outer legs of the E-shaped core member to which they are secured.

6. In an electric watthour meter of the induction type, in combination: a rotatably mounted disc armature, a voltage electromagnet arranged on one side of said disc, said voltage electromagnet including a first group of substantially E-shaped laminations of magnetic material secured together to form a substantially E-shaped laminated core member, said voltage core member having its center leg forming a voltage flux pole, a current electromagnet arranged on the other side of said disc, said current electromagnet including a plurality of substantially U-shaped laminations of magnetic material secured together to form a substantially U-shaped core member having its legs forming a pair of spaced current flux poles, said voltage and current poles being substantially symmetrically arranged with their respective legs lying in a substantially common plane and extending toward each other and at right angles to said disc, and a flat planar voltage flux return member forming a part of said voltage electromagnet and lying in a plane parallel to said common plane, said flux return member comprising a second group of E-shaped laminations positioned on one side of said first group of E-shaped laminations, each lamination of said second group having a substantially U-shaped portion formed as an integral extension of the ends of the outer legs thereof whereby a substantially U-shaped voltage flux return member is provided, the base portion of the U-shaped extension so formed being located on the current electromagnet side of the disc where it extends along one side of the pole portions of the current electromagnet and is displaced therefrom by non-magnetic means, the legs of the U-shaped extension extending upwardly from the ends of the base portion around the edge of the disc.

7. In an electric watthour meter of the induction type, in combination; a rotatably mounted disc armature, a voltage electromagnet including a substantially E-shaped core member which has its central leg forming a voltage flux pole arranged on one side of said disc, a voltage winding comprising a plurality of turns arranged around the center leg of said voltage core, a current electromagnet including a pair of spaced core members projecting from a common base member to form a pair of current flux poles arranged on the other side of said disc, a current winding comprising at least one partially-open turn arranged around said base member, said voltage and current flux poles being substantially symmetrically arranged with their respective core members lying in a substantially common plane and extending toward each other and at right angles to said disc, and a flat planar voltage flux return member lying in a plane parallel to said common plane and having a first portion located on the current electromagnet side of the disc where it extends along one side of the pole portions of the current electromagnet and is displaced therefrom by non-magnetic means, said voltage flux return member having second portions at each end of the first portion which extend around the edge of the disc and are magnetically coupled to the outer legs of the E-shaped core member.

8. The invention defined by claim 7 in which the outer portions of the current core members are displaced toward each other to minimize the spacing therebetween.

9. The combination defined by claim 8 wherein said current winding comprises a pair of partially open turns which are preformed prior to assembly on the current core from substantially rigid electrically conducting rod stock.

10. The combination defined by claim 9 wherein the diameter of said rod stock is substantially greater than the spacing between said current poles.

11. In an electric watthour meter of the induction type, in combination: a rotatably mounted disc armature, a voltage electromagnet arranged on one side of said disc, said voltage electromagnet including a substantially E-shaped core member having its center leg forming a voltage flux pole, a current electromagnet arranged on the other side of said disc, said current electromagnet including a substantially U-shaped core member having its legs forming a pair of spaced current flux poles, said voltage and current flux poles being substantially symmetrically arranged with their respective legs lying in a substantially common plane and extending toward each other and at right angles to said disc, a magnetic shunt secured to the U-shaped core member extending along one side of the pole portions of the current electromagnet whereby it bridges the gap which separates the current flux poles, and a flat planar voltage flux return member lying in a plane parallel to said common plane and having a first portion thereof located on the current electromagnet side of the disc, said first portion extending along the other side of the pole portions of the current electromagnet and displaced therefrom by non-magnetic means, said voltage flux return member having second portions at each end of the first portion, said second portions extending around the disc and being magnetically coupled to the outer legs of the E-shaped core member.

References Cited in the file of this patent

UNITED STATES PATENTS

| | | |
|---|---|---|
| 1,010,271 | Lanphier | Nov. 28, 1911 |
| 1,605,061 | Paschen | Nov. 2, 1926 |
| 1,745,842 | Callsen | Feb. 4, 1930 |
| 1,947,411 | Geyger | Feb. 13, 1934 |
| 2,278,995 | Kinnard | Apr. 7, 1942 |
| 2,656,512 | Lanahan | Oct. 20, 1953 |

FOREIGN PATENTS

| | | |
|---|---|---|
| 525,441 | Great Britain | Aug. 28, 1940 |